(12) United States Patent
Marston et al.

(10) Patent No.: US 9,202,073 B2
(45) Date of Patent: Dec. 1, 2015

(54) SECURITY MEASURES FOR DATA PROTECTION

(71) Applicant: Fairchild Semiconductor Corporation, San Jose, CA (US)

(72) Inventors: Bert Marston, South Portland, ME (US); John R. Turner, Portland, ME (US); Michael Smith, Weare, NH (US); Kenneth P. Snowdon, Falmouth, ME (US); Nathan Charland, Scarborough, ME (US)

(73) Assignee: FAIRCHILD SEMICONDUCTOR CORPORATION, San Jose, CA (US)

( * ) Notice: Subject to any disclaimer, the term of this patent is extended or adjusted under 35 U.S.C. 154(b) by 0 days.

(21) Appl. No.: 14/086,591

(22) Filed: Nov. 21, 2013

(65) Prior Publication Data

US 2014/0143887 A1    May 22, 2014

Related U.S. Application Data

(60) Provisional application No. 61/729,221, filed on Nov. 21, 2012.

(51) Int. Cl.
*G06F 21/62* (2013.01)
*G06F 21/86* (2013.01)
*G06F 12/14* (2006.01)

(52) U.S. Cl.
CPC ............ *G06F 21/62* (2013.01); *G06F 12/1441* (2013.01); *G06F 21/86* (2013.01); *G06F 2212/202* (2013.01); *G06F 2221/2143* (2013.01); *G06F 2221/2147* (2013.01)

(58) Field of Classification Search
CPC .................................................. G06F 3/0679
USPC ....................................................... 726/26–30
See application file for complete search history.

(56) References Cited

U.S. PATENT DOCUMENTS

| 5,809,553 | A  | * | 9/1998  | Choi et al. ..................... 711/170 |
| 7,249,231 | B2 | * | 7/2007  | Babudri et al. ............... 711/156 |
| 7,398,554 | B1 | * | 7/2008  | Falik et al. ...................... 726/23 |
| 2008/0178299 | A1 | * | 7/2008  | Merkle et al. ................... 726/29 |
| 2010/0255772 | A1 | * | 10/2010 | Hellman ...................... 455/3.06 |
| 2013/0295421 | A1 | * | 11/2013 | Teramoto et al. ............... 429/61 |

* cited by examiner

*Primary Examiner* — Josnel Jeudy
(74) *Attorney, Agent, or Firm* — Schwegman Lundberg & Woessner, P.A.

(57) ABSTRACT

This document discusses, among other things, security measures for shielding or protecting data or sensitive signals on an integrated circuit (IC). The systems and methods disclosed herein can allow erasing sensitive data when access is not locked, locking out access to sensitive data during normal operations through both indirect and direct means, and shielding sensitive signals from invasive probing or manipulation.

13 Claims, 6 Drawing Sheets

SECURITY MEASURES FOR DATA PROTECTION

CLAIM OF PRIORITY

This application claims the benefit of priority under 35 U.S.C. §119(e) of U.S. Provisional Patent Application Ser. No. 61/729,221, titled "SECURITY MEASURES FOR DATA PROTECTION," filed on Nov. 21, 2012, which is incorporated by reference herein in its entirety.

BACKGROUND

Many electronic devices have non-volatile memory (NVM) configured to store sensitive data. For example, to encrypt and decrypt data out and into the electronic device, an encryption key must be known, and in most cases, stored in memory. If read or write access is permitted to that memory location, the key could be read, allowing decryption of data going into or coming out of the electronic device, or rewritten, disabling encrypted communication to or from the electronic device.

OVERVIEW

This document discusses, among other things, security measures for shielding or protecting data or sensitive signals on an integrated circuit (IC). The systems and methods disclosed herein can allow erasing sensitive data when access is not locked, locking out access to sensitive data during normal operations through both indirect and direct means, and shielding sensitive signals from invasive probing or manipulation the integrated circuit.

This section is intended to provide an overview of subject matter of the present patent application. It is not intended to provide an exclusive or exhaustive explanation of the invention. The detailed description is included to provide further information about the present patent application.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

The present inventors have recognized, among other things, security measures for shielding or protecting data or sensitive signals on an integrated circuit (IC). The systems and methods disclosed herein can allow erasing sensitive data when access is not locked, locking out access to sensitive data during normal operations through both indirect and direct means, and shielding sensitive signals from invasive probing or manipulation the integrated circuit.

Multiple lockout words for NVM accesses can be saved in NVM. The lockout words can be used to prevent access from external interfaces to protected memory, allow access to internal logic that requires access for normal operation, and allow access for test modes until set. The lockout words can be selected based on one or more of a use model of a test program, fabrication uninitialized values, or compliments of each other. The location of the lockout words can be selected based on one or more of the same bit locations in a memory output port or the location of protected data.

Figure 1:
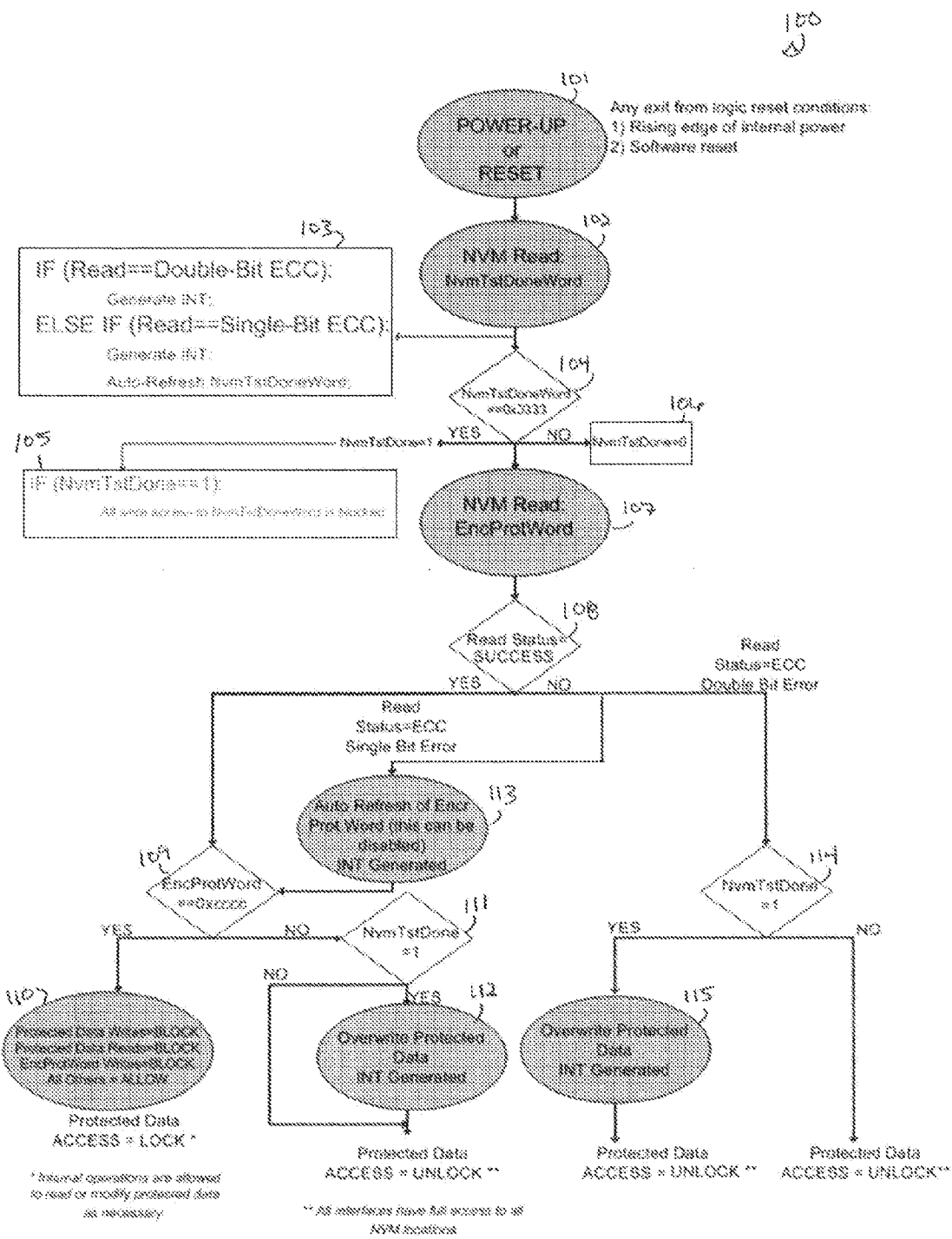
FIG. 1 illustrates generally an example flow diagram illustrating non-volatile memory (NVM) lockout protection.

FIG. 1 illustrates generally an example flow diagram 100 illustrating non-volatile memory (NVM) lockout protection. At 101, process starts with power-up or reset. In an example, any exit from logic can reset conditions, such as a rising edge of internal power, a software reset, or one or more other reset condition. At 102, the word NvmTstDoneWord in NVM is read. At 103, if an error is found during the read, an interrupt can be generated. If a single-bit error is detected, the word can be automatically refreshed.

If, at 104, the NvmTstDoneWord is a specific value (e.g., a first lockout word, such as 0x3333, etc.), at 105, bit NvmTstDone can be set to 1 and all write access to NvmTstDoneWord can be blocked. If, at 104, the NvmTstDoneWord is not the specific value, at 106, bit NvmTstDone can be set to 0 and process can continue.

At 107, the word EncProtWord in NVM is read. At 108, if the read is a success (e.g., no errors found), and process can continue. If, at 109, the EncProtWord is a specific value (e.g., a second lockout word, such as 0xcccc (complement of the first lockout word), etc.), at 110, protected data writes and reads are blocked, EncProtWord writes are blocked, but all other internal operations are allowed to read and modify protected data as necessary.

If, at 109, the EncProtWord is not the specific value, NvmTstDone is checked. If, at 111, NvmTstDone is 1, protected data is overwritten and an interrupt is generated. If, at 111, NvmTstDone is not 1, protected data access is unlocked, and all interfaces have full access to all NVM locations.

If, at 108, the read status is not a success and a single-bit error has been detected, then, at 113, the EncProtWord can be refreshed and process can then return to 109. If, at 108, the read status is not a success and a double-bit error has been detected, then, NvmTstDone is again checked at 114. If NvmTstDone is set (equal to 1), then, at 115, protected data is overwritten and an interrupt is generated. If, at 114, NvmTstDone is not set to 1, protected data access is set to unlock. Process returns to 101 at power-up or reset.

Figure 2:
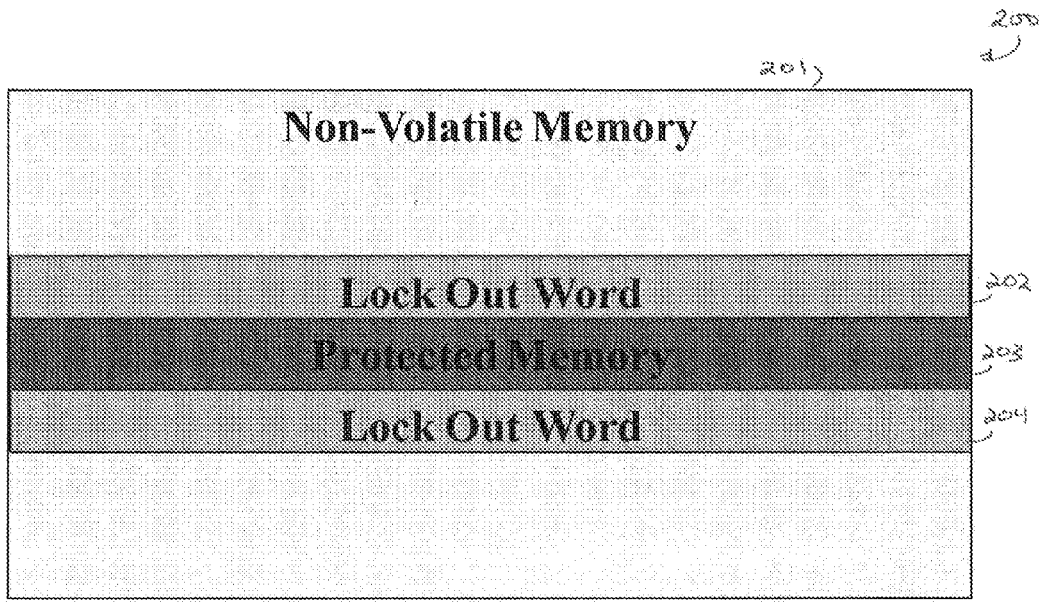
FIGS. 2-3 illustrate generally example lockout word locations.
Figure 3:
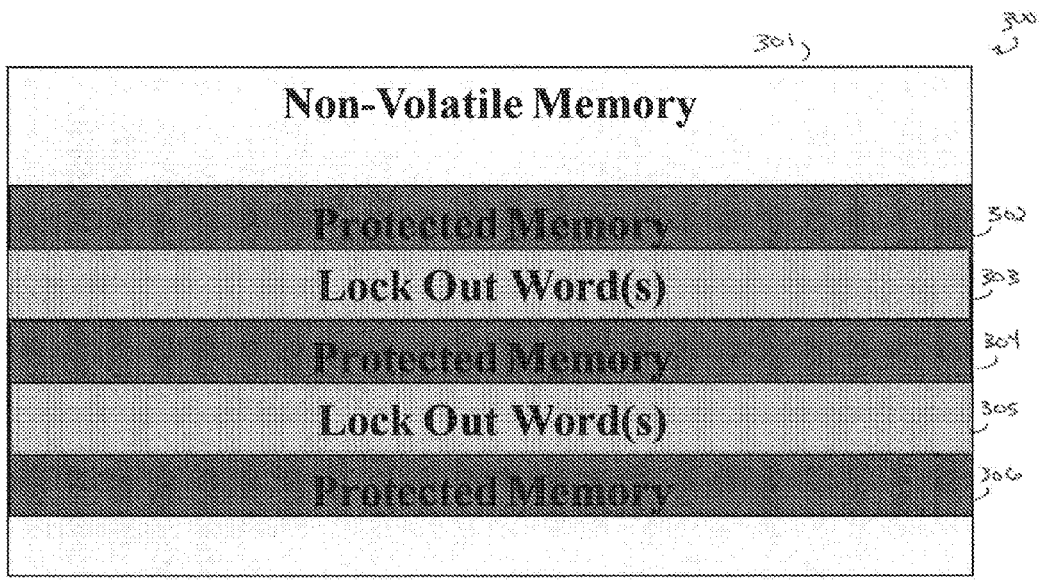

FIGS. 2-3 illustrate generally example lockout word locations 200, 300 in non-volatile memory 201, 301. FIG. 2 illustrates generally first and second lockout words 202, 204 surrounding protected data 203 to prevent isolated data corruption. FIG. 3 illustrates generally first and second lockout words 303, 305 embedded between two or more protected memory locations 302, 304, 306. In certain examples, once a lockout word is set, it cannot be changed.

In an example, error correction code (ECC) failure on lockout words can always lock out external interfaces. If a first lockout word (or words) is (are) in an unlocked state, a state machine can clear protected memory if a second lockout word (or words) is (are) also set. However, if a first lockout word (or words) is set, external access to sensitive date is always locked out, even if other lockout words are not set.

Figure 4:
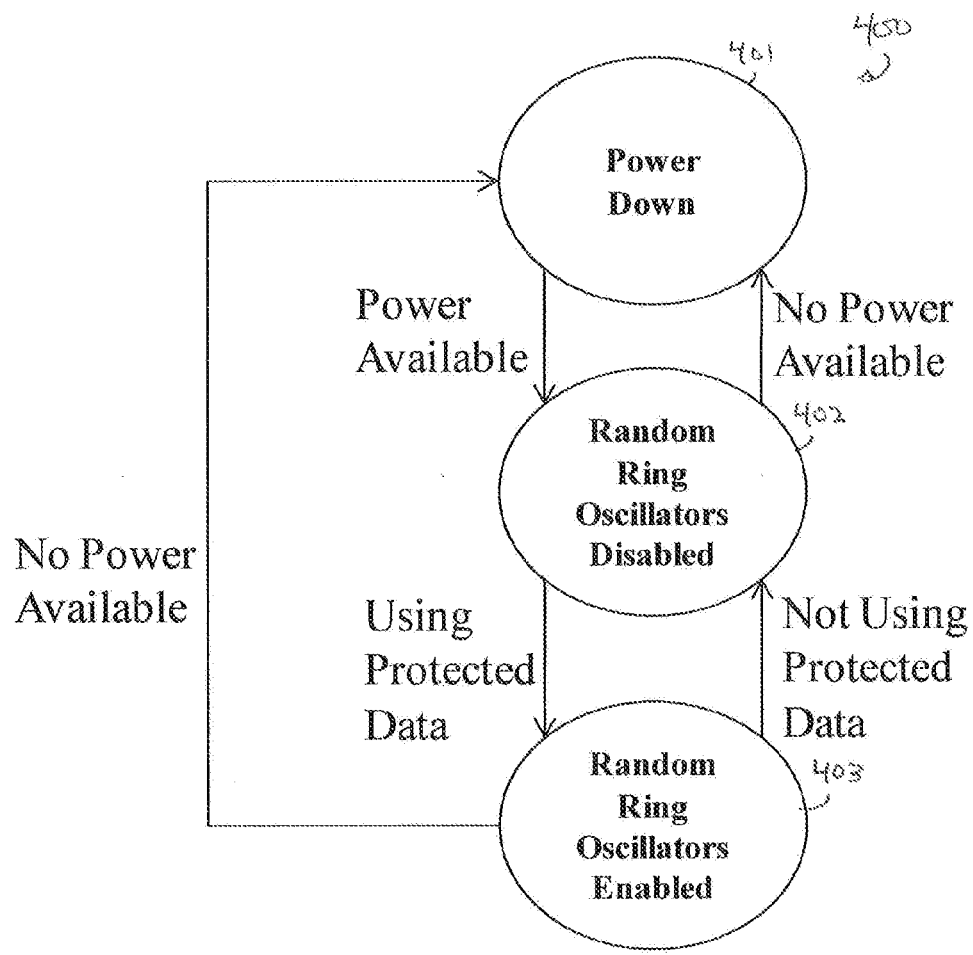
FIG. 4 illustrates generally example ring oscillator operation.

FIG. 4 illustrates generally example ring oscillator operation 400 configured to protect sensitive data. Multiple random ring oscillators can be enabled to add noise to a power supply when sensitive data is in use. At 401, no power is available. At 402, power is available, but protected data is not being used, and random ring oscillators are disabled. At 403, power is available and protected data is being used, and random ring oscillators are enabled.

Figure 5:
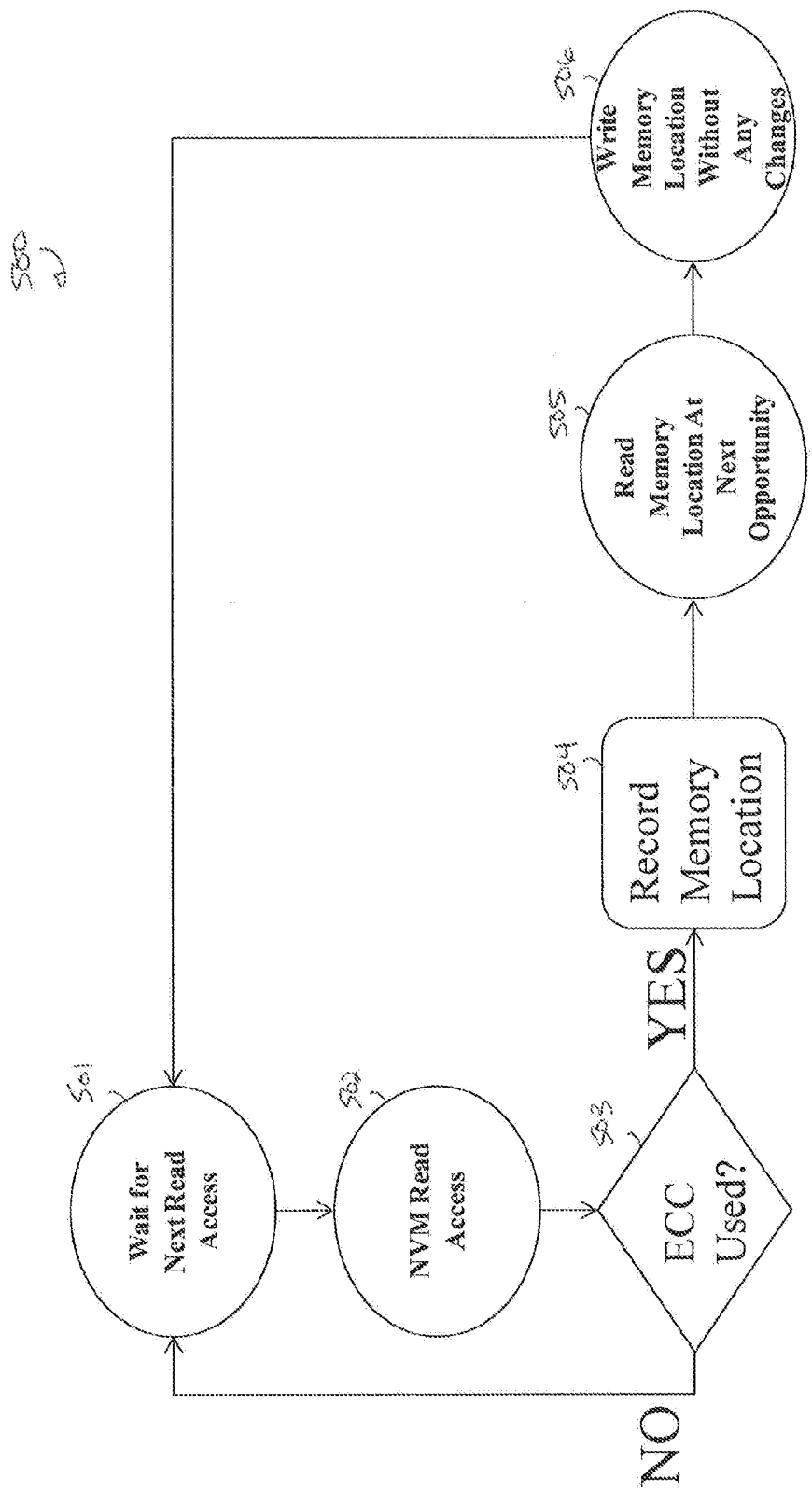
FIG. 5 illustrates generally example auto-refresh of NVM locations.

FIG. 5 illustrates generally example auto-refresh 500 of NVM locations to prolong the life of saved data, without allowing external interfaces access to protected memory, auto refresh of NVM locations, including sensitive data and lockout words, when NVM ECC is used but read access did not fail. At 501, wait for next read access. At 502, NVM read access occurs. If, at 503, ECC is not used, then process returns to 501. If, at 503, ECC is used, at 504, the memory location is recorded. At 505, the memory location is read at next opportunity. At 506, the memory location is written without changes and process returns to 501.

Figure 6:
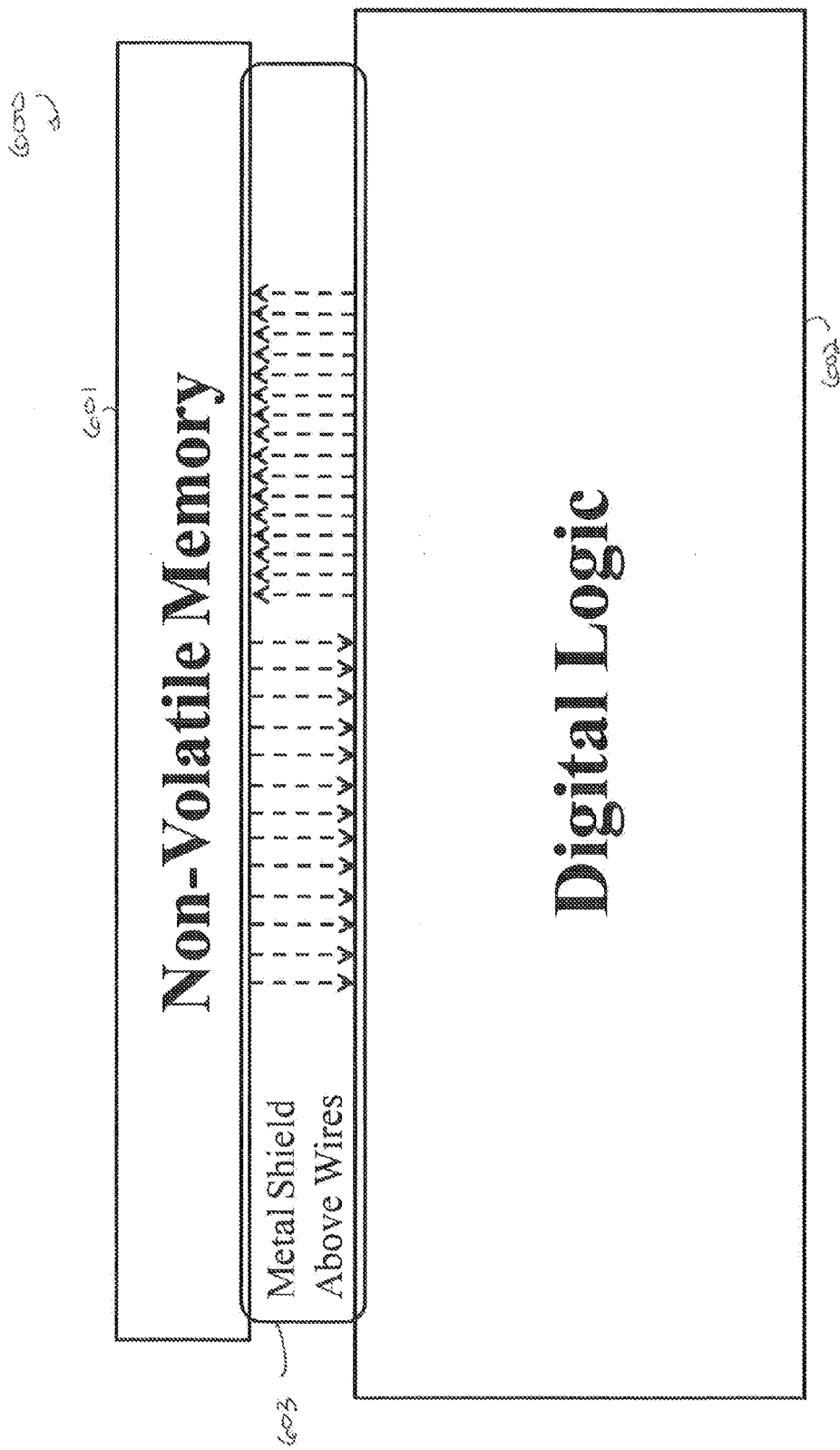
FIG. 6 illustrates generally example metal shielding.

FIG. 6 illustrates generally example metal shielding 600 of communication pathways between non-volatile memory (NVM) 601 and, for example, digital logic 602 using a metal shield 603. The metal shield 603 can be used to prevent probing and manipulation of digital signals. In other examples, the metal shield 603 can cover one or more other communication pathways in or out of NVM 601.

Figure 7:
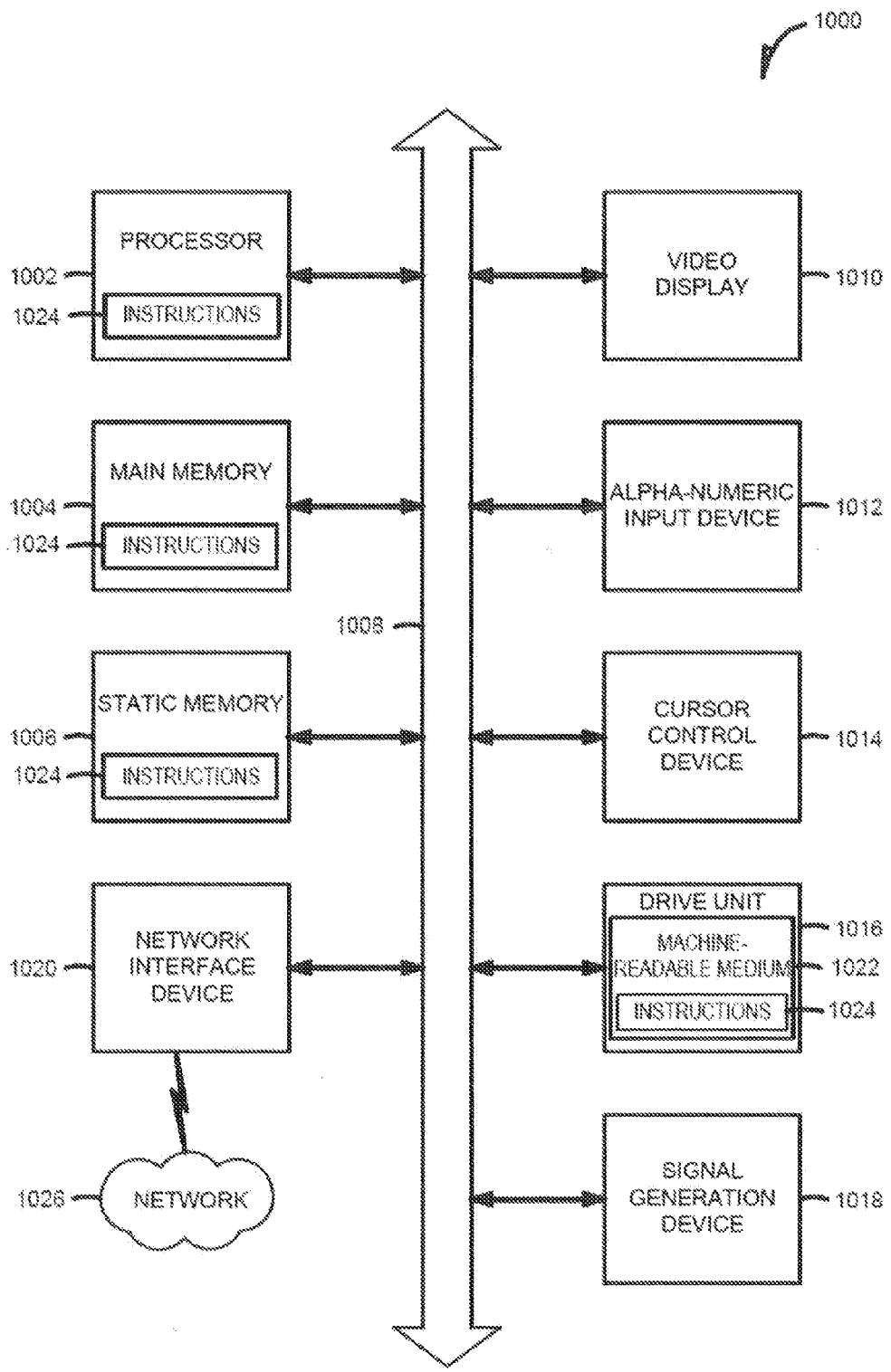
FIG. 7 illustrates generally an example computer system.

FIG. 7 illustrates generally an example computer system 1000 within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a server computer, a client computer, a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

Example computer system 1000 includes a processor 1002 (e.g., a central processing unit (CPU) a graphics processing unit (GPU) or both), a main memory 1004 and a static memory 1006, which communicate with each other via a bus 1008. The computer system 1000 may further include a video display unit 1010 (e.g., a liquid crystal display (LCD) or a cathode ray tube (CRT)). The computer system 1000 also includes an alphanumeric input device 1012 (e.g., a keyboard), a cursor control device 1014 (e.g., a mouse), a disk drive unit 1016, a signal generation device 1018 (e.g., a speaker) and a network interface device 1020.

Disk drive unit 1016 includes a machine-readable medium 1022 on which is stored one or more sets of instructions (e.g., software 1024) embodying any one or more of the methodologies or functions described herein. The software 1024 may also reside, completely or at least partially, within the main memory 1004, static memory 1006, and/or within the processor 1002 during execution thereof by the computer system 1000, the main memory 1004, the static memory 1006, and the processor 1002 also constituting machine-readable media.

Software 1024 may further be transmitted or received over a network 1026 via the network interface device 1020.

While the machine-readable medium 1022 is shown in an example embodiment to be a single medium, the term "machine-readable medium" should be taken to include a single medium or multiple media (e.g., a centralized or distributed database and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present disclosure. The term "machine-readable medium" shall accordingly be taken to include, but not be limited to, solid-state memories, optical and magnetic media, and carrier wave signals.

Certain embodiments are described herein as including logic or a number of modules, components or mechanisms. A module, logic, component or mechanism (herein after collectively referred to as a "module") may be a tangible unit capable of performing certain operations and is configured or arranged in a certain manner. In example embodiments, one or more computer systems (e.g., a standalone, client or server computer system) or one or more components of a computer system (e.g., a processor or a group of processors) may be configured by software (e.g., an application or application portion) as a "module" that operates to perform certain operations as described herein.

In various embodiments, a "module" may be implemented mechanically or electronically. For example, a module may comprise dedicated circuitry or logic that is permanently configured (e.g., within a special-purpose processor) to perform certain operations. A module may also comprise programmable logic or circuitry (e.g., as encompassed within a general-purpose processor or other programmable processor) that is temporarily configured by software to perform certain operations. It will be appreciated that the decision to implement a module mechanically, in the dedicated and permanently configured circuitry, or in temporarily configured circuitry (e.g., configured by software) may be driven by cost and time considerations.

Accordingly, the term "module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which modules or components are temporarily configured (e.g., programmed), each of the modules or components need not be configured or instantiated at any one instance in time. For example, where the modules or components comprise a general-purpose processor configured using software, the general-purpose processor may be configured as respective different modules at different times. Software may accordingly configure the processor to constitute a particular module at one instance of time and to constitute a different module at a different instance of time.

Modules can provide information to, and receive information from, other modules. Accordingly, the described modules may be regarded as being communicatively coupled. Where multiple of such modules exist contemporaneously, communications may be achieved through signal transmission (e.g., over appropriate circuits and buses) that connect the modules. In embodiments in which multiple modules are configured or instantiated at different times, communications between such modules may be achieved, for example, through the storage and retrieval of information in memory structures to which the multiple modules have access. For example, a one module may perform an operation, and store the output of that operation in a memory device to which it is communicatively coupled. A further module may then, at a later time, access the memory device to retrieve and process the stored output. Modules may also initiate communications with input or output devices, and can operate on a resource (e.g., a collection of information).

Additional Notes

The above detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventor also contemplates examples in which only those elements shown or described are provided. Moreover, the present inventor also contemplates examples using any combination or permutation of those elements shown or described (or one or more aspects thereof), either with respect to a particular example (or one or more aspects thereof), or with respect to other examples (or one or more aspects thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document, for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, in an example, the code can be tangibly stored on one or more volatile, non-transitory, or non-volatile tangible computer-readable media, such as during execution or at other times. Examples of these tangible computer-readable media can include, but are not limited to, hard disks, removable magnetic disks, removable optical disks (e.g., compact disks and digital video disks), magnetic cassettes, memory cards or sticks, random access memories (RAMs), read only memories (ROMs), and the like.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. §1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

What is claimed is:

1. A method, comprising:
    protecting locations in non-volatile memory (NVM) using first and second lockout words, where the location of the first and second lockout words in the NVM define the location of the protected NVM, and wherein the protecting locations in NVM include surrounding the protected NVM with the first and second lockout words; and
    enabling a random ring oscillator to add noise to a power supply when a protected memory location is being accessed in NVM.

2. The method of claim 1, wherein the first lockout word is a complement of the second lockout word.

3. The method of claim 1, wherein the protecting locations in NVM include positioning first and second lockout words between protected NVM locations.

4. The method of claim 1, including overwriting protected data if errors are detected.

5. The method of claim 1, including shielding a data path to or from the NVM using metal.

6. A non-transitory machine-readable medium storing instructions that, when executed by a machine, cause the machine to:
    prevent read and write access to protected locations in non-volatile memory (NVM) using first and second lockout words, where the location of the first and second lockout words in the NVM define the location of the protected NVM, wherein the first and second lockout words surround the protected NVM locations; and
    enable a random ring oscillator to add noise to a power supply when a protected memory location is accessed in NVM.

7. The non-transitory machine-readable medium of claim 6, wherein the first lockout word is a complement of the second lockout word.

8. The non-transitory machine-readable medium of claim 6, wherein the first and second lockout words are between protected NVM locations.

9. A system, comprising:
    a non-volatile memory (NVM) module having memory locations; and
    a processor module configured to read one or more memory locations of the NVM, wherein, if the processor reads first and second lockout words, the processor protects NVM locations defined by the location of the first and second lockout words in the NVM, wherein the processor is configured to lock access to a NVM location if the first and second lockout words surround the memory location, and wherein the processor is configured to enable a random ring oscillator to add noise when a protected location is being accessed in NVM.

10. The system of claim 9, wherein the first lockout word is a complement of the second lockout word.

11. The system of claim 9, wherein the processor is configured to lock access to a plurality of NVM locations if the first and second lockout words are between occupied memory locations.

12. The system of claim 9, wherein the processor is configured to overwrite protected data if errors are detected.

13. The system of claim 9, including a metal shield configured to shield a data path to or from the NVM.

* * * * *